April 4, 1961  S. LARACH  2,978,417
PHOSPHORS
Filed April 25, 1958 4 Sheets-Sheet 1

INVENTOR.
Simon Larach
BY
ATTORNEY

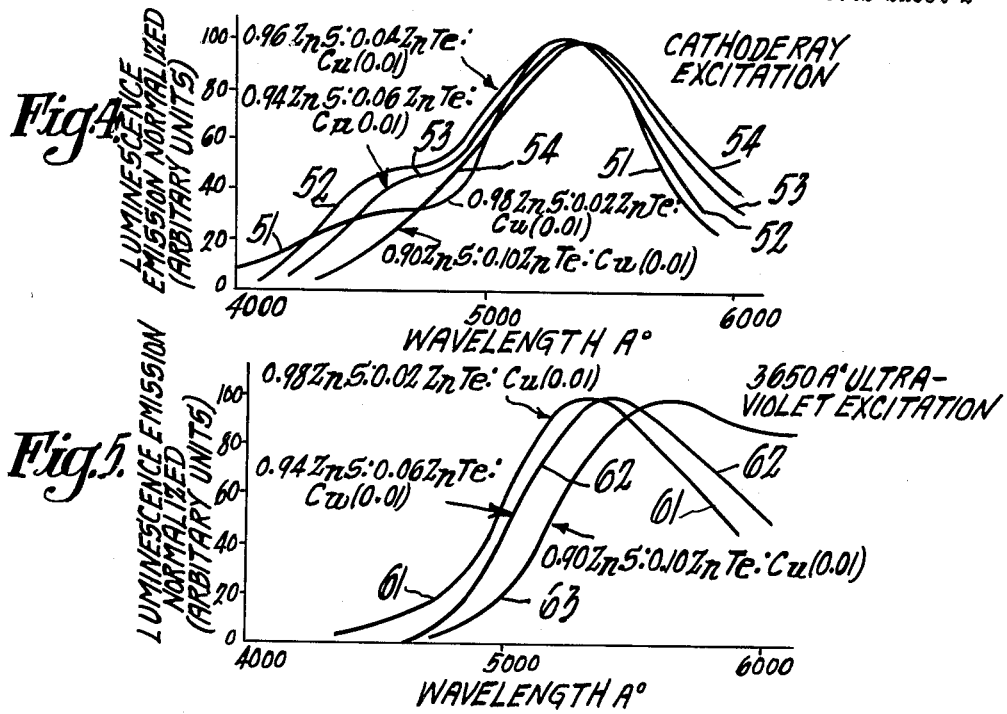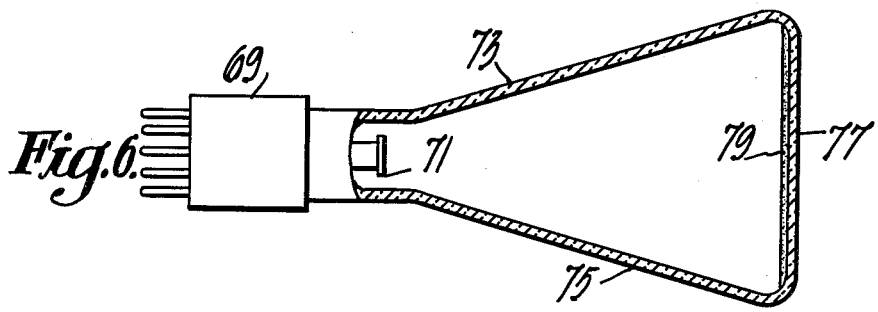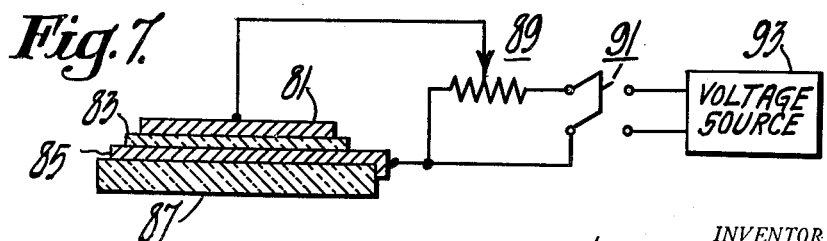

INVENTOR.
SIMON LARACH
BY
ATTORNEY

INVENTOR.
SIMON LARACH
BY
ATTORNEY

United States Patent Office 2,978,417
Patented Apr. 4, 1961

2,978,417
PHOSPHORS

Simon Larach, Princeton, N.J., assignor to Radio Corporation of America, a corporation of Delaware Filed Apr. 25, 1958, Ser. No. 731,589

9 Claims. (Cl. 252—301.6)

This is a continuation-in-part of U.S. patent applications Serial No. 490,253, filed February 24, 1955; Serial No. 521,207, filed July 11, 1955; and Serial No. 635,783, filed January 23, 1957, each by Simon Larach all now abandoned.

This invention relates generally to improved luminescent materials, also known as phosphors and particularly but not necessarily exclusively, to improved chalcogenide phosphors.

It is an object of this invention to provide improved phosphors of the mixed chalcogenide family.

A further object is to provide improved phosphors adapted to ultra violet, X-ray, cathode ray, and electric field excitation.

In general, the mixed chalcogenide phosphors of the invention consist essentially of a single phase solid solutions of sulfo-tellurides, seleno-tellurides, and sulfo-seleno-tellurides of zinc, cadmium and zinc-cadmium. A feature of the invention is the discovery of limited ranges of compositions in the sulfo-seleno-telluride system which produce single phase solid solutions, which solid solutions produce useful host crystals. Where the host crystal is principally a seleno-telluride, the host crystal may contain up to about 5 mol percent of sulfide. Where the host crystal is principally a seleno-sulfide, the host crystal may contain up to about 15 mol percent of telluride. Where the host crystal is principally a selenide, the host crystal may contain up to 33 mol percent of telluride and/or sulfide. Inefficient phosphors result where more than one phase is present. Cadmium may replace part or all of the zinc. The host crystal may have incorporated therein activator proportions of one or more impurities of the group consisting of copper, silver, gold, and manganese, or may contain no added impurity. Suitable activator proportions are 0.0001 to 0.5 weight percent with respect to the weight of said host crystal. Increasing substitutions of tellurium for sulfur and/or selenium in the host crystal shifts the luminescence emission of the phosphor toward the red end of the spectrum. This effect is noticeable when as little as 0.001 mol percent of tellurium is present. The phosphors herein will luminesce when excited with electric fields (electroluminescence), cathode rays (cathodoluminescence), or ultra violet or X-rays (photoluminescence).

The preferred cathodoluminescent phosphors herein comprise a host crystal composed of zinc seleno-tellurides and sulfo-seleno-tellurides containing activator proportions of one impurity of the group consisting of copper and silver.

The preferred electroluminescent phosphors herein comprise a host crystal consisting essentially of zinc seleno-tellurides and zinc sulfo-tellurides containing activator proportions of copper and activator proportions of a member of the group consisting of (1) bromine and (2) bromine and gallium incorporated in said host crystal.

The foregoing objects and other advantages are described in detail by reference to the accompanying drawings in which:

Figure 4 is a family of curves illustrating the spectral distribution of the emission from several phosphors of the invention prepared with 0.01 percent by weight of copper activator and 2 percent by weight of sodium chloride flux and excited with cathode rays;

Figure 5 is a family of curves illustrating the spectral distribution of the emission from several phosphors of the invention prepared with 0.01 percent by weight of copper activator and 2 percent by weight of sodium chloride flux and excited with ultraviolet rays;

Figure 6 is a partially-sectional view of a cathode ray tube having a luminescent screen on the face plate thereof including a phosphor of the invention; and Figure 7 is a partially-sectional, partially-schematic view of an electroluminescent device including a phosphor of the invention.

Figure 9:
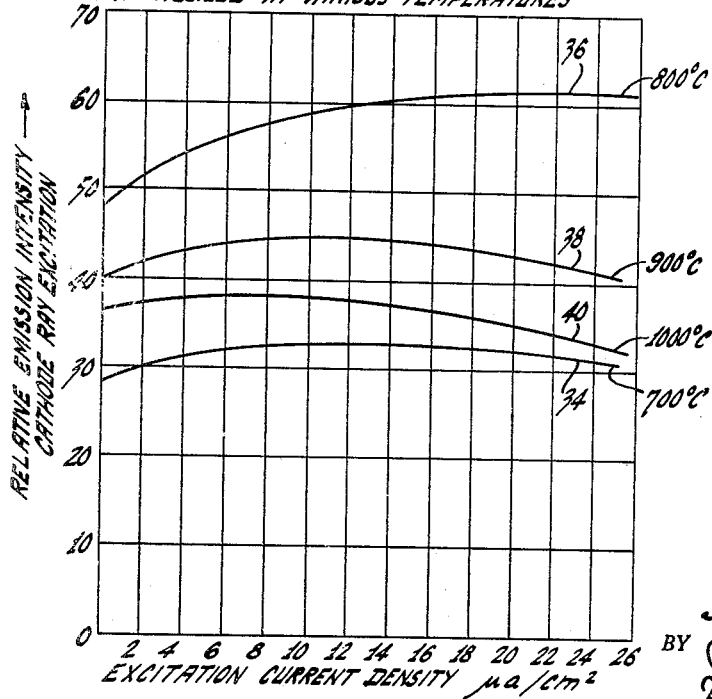
Figure 10:
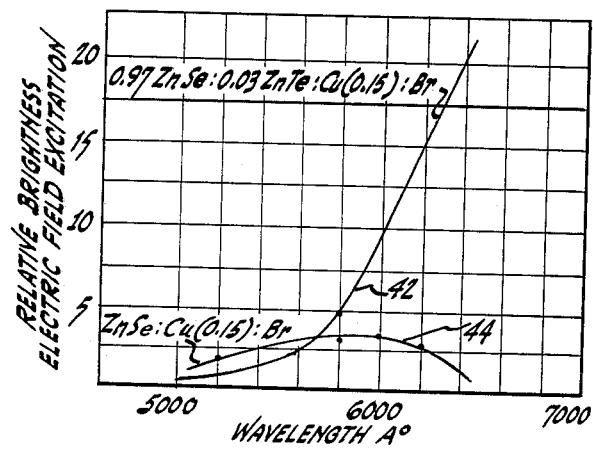

Figure 9 is a family of curves illustrating the relative emission intensity of 0.95 ZnSe : 0.05 ZnTe : Cu (0.01) crystallized at various temperatures as a function of current density during cathode ray excitation; and Figure 10 is a family of curves illustrating the spectral distribution of electroluminescence emission of a phosphor of the invention compared with a similar phosphor without tellurium, and Figure 11 is a portion of a triaxial diagram of the zinc sulfide-zinc selenide-zinc telluride system showing the location of the single phase phosphors of the invention.

Figure 11:
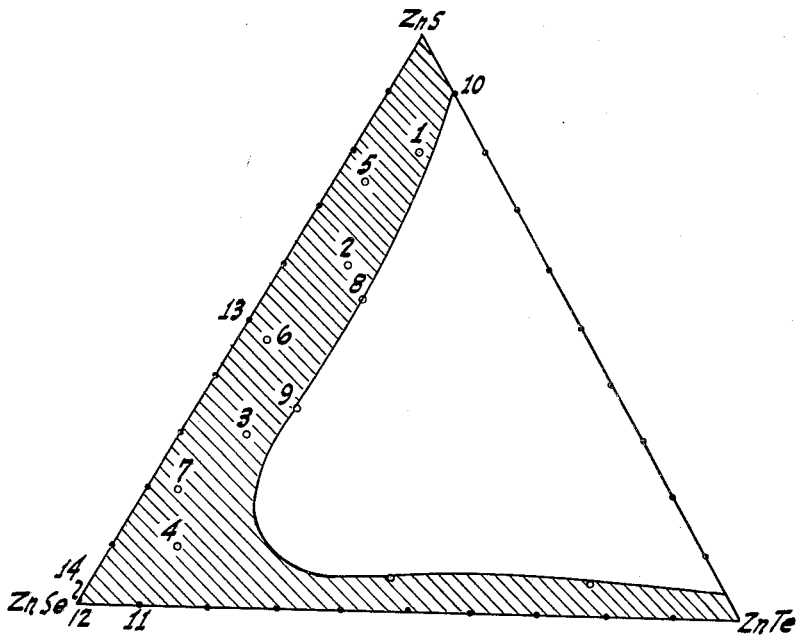

The phosphors in accordance with the invention consist essentially of a single phase solid solution having a composition within the shaded area of Figure 11. Part or all of the zinc may be replaced with cadmium. The phosphors herein may contain an added impurity such as copper, silver, gold or manganese to enhance the luminescence characteristics thereof, or may contain no added impurity.

The phosphors herein may be approximately described as sulfo-tellurides, sulfo-seleno-tellurides and seleno-tellurides of zinc and/or cadmium; or by the molar formula:

$$aM^1S : bM^2Se : cM^3Te : M^4(z)$$ 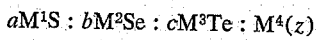

wherein: $M^1$, $M^2$ and $M^3$ are each at least one member of the group consisting of zinc and cadmium, $M^4$ is at least one impurity of the group consisting of copper, silver, gold and manganese, and $a$=0.000 to 0.999 when $c$ is 0.15 or less and 0.000 to 0.050 when $c$ is more than 0.15
$b$=0.000 to 0.999 mols
$c$=0.001 to 0.999 when $a$ is 0.05 or less and 0.001 to 0.150 when $a$ is more than 0.05
$a+b+c$=1.000
$z$=0.0 to 0.5.

I. SULFO-TELLURIDES

Figure 1:
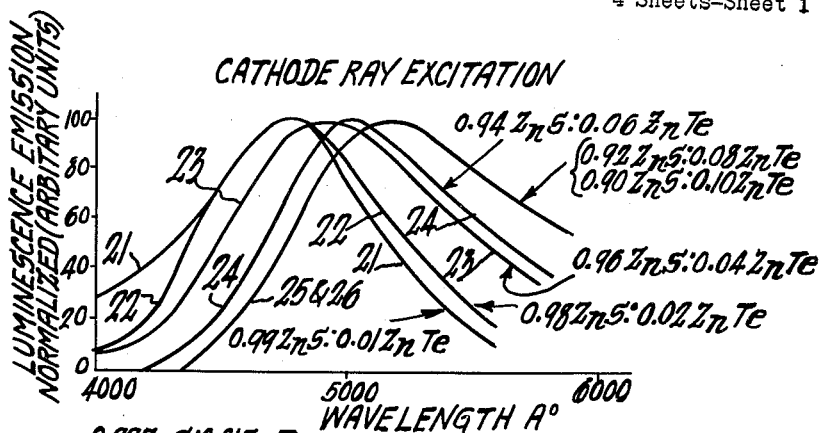
Figure 1 is a family of curves illustrating the spectral distribution of the emission from several phosphors of the invention prepared without an activator and without a flux and excited with cathode rays.

*Example 1.*—Slurry a mixture of 94.2 grams of zinc sulfide and 5.8 grams of zinc telluride in triple-distilled water. Dry and fire the mixture at 900° C. in a nitrogen atmosphere for about 30 minutes. The composition of the fired product calculated from the initial mixture is 0.96 ZnS: 0.04 ZnTe. Referring to Figure 1, the spectral distribution of the emission from this phosphor when excited with cathode rays is shown by the curve 23. Other phosphors prepared without an activator and without a flux are shown in Figure 1. Increasing proportions of ZnTe up to about 8 mole percent shifts $\lambda_{PK}^{CR}$ (the peak wavelength under cathode ray excitation) toward the red end of the spectrum $\lambda_{PK}^{CR}$ remains substantially constant with further increases in ZnTe.

Figure 2:
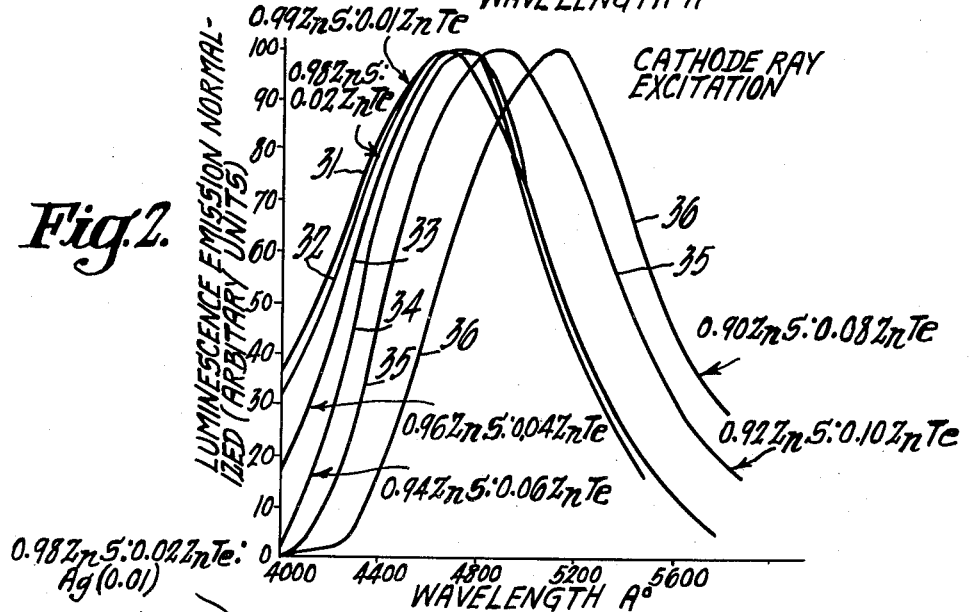
Figure 2 is a family of curves illustrating the spectral distribution of the emission from several phosphors of the invention prepared without an activator and with 2 percent of sodium chloride as a flux and excited with cathode rays.

*Example 2.*—Slurry a mixture of 89.0 grams of zinc sulfide, 11.0 grams of zinc telluride and 2.0 grams of sodium chloride in triple-distilled water. Dry and fire the mixture at 1000° C. in a nitrogen atmosphere for about 30 minutes. The composition of the fired product calculated from the initial mixture is 0.94 ZnS:0.06 ZnTe. Referring to Figure 2, the spectral distribution of the emission from this phosphor when excited with cathode rays is shown by the curve 34. Other phosphors prepared without an activator but with a sodium chloride flux are shown in Figure 2.

The inclusion of NaCl during synthesis has several effects: (1) the unfluxed phosphors with up to 2 mole percent ZnTe have $\lambda_{PK}^{CR}$ (peak wavelength under cathode ray excitation) at about 465 A; (2) with incorporation of ZnTe up to 2 mole percent in the fluxed phosphors, there is a decrease in $\lambda_{PK}^{CR}$ to 5190 A. for 0.90 ZnS:0.10 ZnTe; (3) the fluxed materials do not show a levelling-off of $\lambda_{PK}^{CR}$ at 8 percent ZnTe, as do unfluxed phosphors; (4) fluxed materials with 6 to 10 mole percent ZnTe show a secondary emission band, with $\lambda_{PK}$ at about 6000 A. The peak emission intensities decrease with increasing proportion of ZnTe, the levelling-off point occurring at about 8 mole percent ZnTe.

Figure 3:
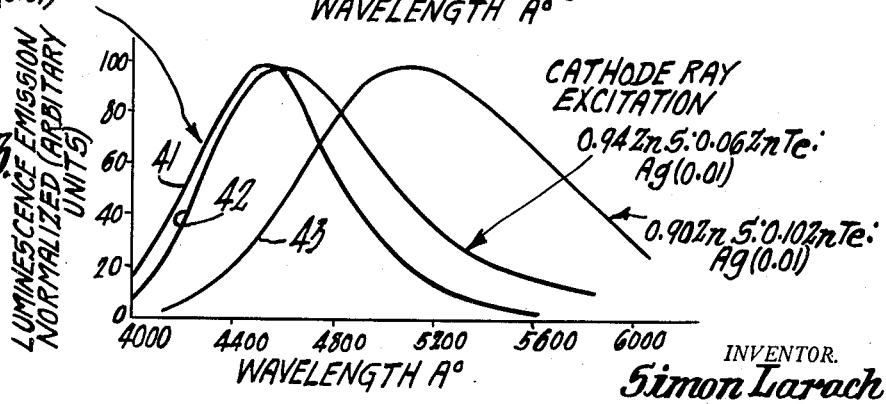
Figure 3 is a family of curves illustrating the spectral distribution of the emission from several phosphors of the invention prepared with 0.01 percent by weight of silver activator and 2 percent by weight of sodium chloride flux and excited with cathode rays.

*Example 3.*—To a mixture of 95 grams of zinc sulfide and 5.0 grams of zinc telluride, add 0.01 gram of silver, as an aqueous solution of silver nitrate, and 2 grams of sodium chloride. Slurry the mixture with triple-distilled water, dry and fire at 900° C. in a nitrogen atmosphere for about 45 minutes. The composition of the fired product calculated from the composition of the initial mixture is 0.98 ZnS:0.02 ZnTe:Ag (0.01). Referring to Figure 3, the spectral distribution of the emission from this phosphor when excited with cathode rays is shown by the curve 41. Other phosphors prepared with silver as the activator and sodium chloride as the flux are shown in Figure 3.

The addition of a silver activator has the following effects: (1) increasing additions of Ag, shifts $\lambda_{PK}^{CR}$ toward shorter wavelengths; (2) with proportions of ZnTe greater than about 4 mole percent, $\lambda_{PK}^{CR}$ shifts toward the longer wavelengths, with an indication that levelling-off is occurring at about 10 mole percent of ZnTe; (3) the secondary (6000 A.) band, present in phosphors without Ag, is absent in the corresponding phosphors containing Ag; (4) the decrease of $\epsilon_{PK}$ (peak emission intensity) for materials with Ag is very similar to that of materials without Ag prepared with NaCl flux.

*Example 4.*—To a mixture of 89 grams of zinc sulfide and 11 grams of zinc telluride, add 0.01 gram of copper, as an aqueous solution of copper chloride, and 2 grams of sodium chloride. Slurry the mixture with triple-distilled water, dry and then fire the mixture at 900° C. in a nitrogen atmosphere for about 30 minutes.

The composition of the fired product calculated from the composition of the initial mixture is 0.94 ZnS:0.06 ZnTe: Cu (0.01). Referring to Figure 4, the spectral distribution of the emission from this phosphor when excited with cathode rays is shown by the curve 53. Referring to Figure 5, the spectral distribution of the emission from this phosphor when excited with ultraviolet is shown by the curve 62. Other phosphors prepared with copper as the activator and sodium chloride as the flux are shown in Figures 4 and 5.

The addition of a copper activator has the following effects on spectral distribution as a function of ZnTe proportion: (1) With ZnTe proportions up to about 10 mole percent, the spectral distribution consists of at least two bands, (*a*) a blue (4600 A.) band of Zn(S:Te), NaCl, and (*b*) a green band of copper. Under UV excitation, the blue band is not evident, and the peak wavelength is shifted toward longer wavelengths more rapidly, than with CR excitation.

*Example 5.*—To a mixture of 94.2 grams of zinc sulfide and 5.8 grams of zinc telluride, add 0.5 gram of manganese, as manganese chloride, and 2.0 grams of sodium chloride. Slurry the mixture with triple-distilled water, dry and then fire the mixture at about 1000° C. in a nitrogen atmosphere. The composition of the fired product calculated from the composition of the initial mixture is 0.96 ZnS:0.04 ZnTe:Mn (0.5). This phosphor exhibits a peak emission wavelength at 4620 A. when excited with cathode rays.

The phosphors prepared with Mn activator exhibit two emission bands, designated as Band I whose peak wavelength was at 4800 A. and Band II with peak wavelength at 5950 A.

Referring to Table I, increasing ZnTe shifts the $\lambda_{PK}^{CR}$ of Band I, for phosphors prepared with NaCl and without NaCl, toward the red end of the spectrum. Increasing proportions of manganese shifts Band I toward the blue end of the spectrum.

*Table I*

EFFECT OF MANGANESE ON PEAK WAVELENGTH OF BAND I EMISSION FROM Zn(S:Te) PHOSPHORS

| Host Crystal | Peak Wavelength | | | |
|---|---|---|---|---|
| | NaCl | | Without NaCl | |
| | Unactivated, A. | Mn, A. | Unactivated, A. | Mn, A. |
| 0.99 ZnS:0.01 ZnTe | 4,650 | 4,580 | 4,800 | |
| 0.98 ZnS:0.02 ZnTe | 4,640 | 4,600 | 4,800 | |
| 0.96 ZnS:0.04 ZnTe | 4,700 | 4,620 | 4,850 | 4,800 |
| 0.94 ZnS:0.06 ZnTe | 4,740 | 4,670 | 5,000 | 4,800 |
| 0.92 ZnS:0.08 ZnTe | 4,850 | 4,700 | 5,200 | 4,900 |
| 0.90 ZnS:0.10 ZnTe | 5,180 | 4,740 | 5,200 | 5,000 |

The sulfo-tellurides are described with respect to particular zinc sulfo-tellurides. Cadmium may be substituted for part or all of the zinc in the phosphors herein. The substitution of cadmium for zinc shifts the peak spectral emission of the phosphors of the invention toward the red end of the spectrum. The ratio of zinc plus cadmium to sulfur plus tellurium is about 1 to 1.

Sulfur, tellurium, zinc and cadmium may be introduced in elemental form or as compounds which are decomposed upon heating to yield the elements into the reaction. It is preferred to introduce these elements as sulfides and tellurides of zinc and cadmium. The sulfide and telluride starting materials should be of luminescence-grade-purity, and should contain no spectrographically-detectable impurities. The synthesis of pure zinc sulfide and cadmium sulfide is described by H. W. Leverenz in "Introduction to Luminescence of Solids", Wiley (1950), New York. Zinc telluride may be obtained by adding elemental tellurium, in several small portions, to molten zinc, at about 800° C., in an atmosphere of hydrogen. The temperature is then raised to 1300° C., and held for 15 minutes, to boil off unreacted zinc and tellurium. After cooling, the zinc telluride is ground and sifted through a 100 mesh screen.

Zinc telluride is soluble in zinc sulfide to the extent of about 10 mole percent, when no selenium is present. Similarly, zinc sulfide is soluble in zinc telluride to the extent of about 5 mole percent. This is unexpected because of the difference in the ionic radius of sulfur (ionic radius=1.84 A.) and tellurium (ionic radius =2.21 A.). Hence, two phases are present in the range 90 mole percent zinc sulfide 10 mole percent zinc telluride to 5 mole percent zinc sulfide: 95 mole percent zinc telluride. Only a single phase is present beyond this range. The invention contemplates single phase sulfotellurides of zinc, cadmium and zinc-cadmium with or without an activator and prepared with or without a flux.

Any of a number of activators may be used, alone or in combination. For example, one may use silver, copper, gold or manganese or combinations thereof. The optimum amount of copper, silver and gold activator is approximately 0.01 percent by weight with respect to the weight of the host crystal; i.e., the combined weight of zinc, cadmium, selenium and tellurium. The proportion of copper, silver and gold activator may be varied in between 0.0001 and 0.1 percent by weight with respect to the weight of the host crystal. Copper, silver and gold preferably are introduced as salts, such as chlorides or nitrates. Manganese may be used as the activator in the range between 0.01 and 2.0 percent by weight, preferably 1.0 percent by weight.

A halide flux may be added to assist the recrystallization of the host crystal. Chlorides, bromides and iodides of alkali metals, alkaline earth metals and volatile cations may be used. For example, sodium chloride, ammonium chloride, calcium bromide and sodium iodide may be used. Sodium chloride is the preferred flux. Between 0.1 to 10.0 percent by weight of flux with respect to the weight of host crystal may be used. The preferred proportion is 2.0%. A non-oxidizing atmosphere, such as argon, nitrogen or hydrogen, preferably nitrogen, may be used. The firing may be carried out within the range between 700° C. and 1300° C., however, a firing temperature of 900° C. is preferred. Firing should be carried on until the solid state reactions take place. The duration of firing depends in part on the batch size. It is preferred to fire the batches of the examples for about 30 to 45 minutes.

II. SELENO-TELLURIDES

*Example 6.*—To a mixture of 93.5 grams of zinc selenide and 6.5 grams of zinc telluride, add 0.01 gram of copper as an aqueous solution of copper chloride and 2 grams of ammonium chloride. Slurry the mixture with triple distilled water, dry and then fire the mixture at 900° C. in a nitrogen atmosphere for about 30 minutes.

Figure 8:
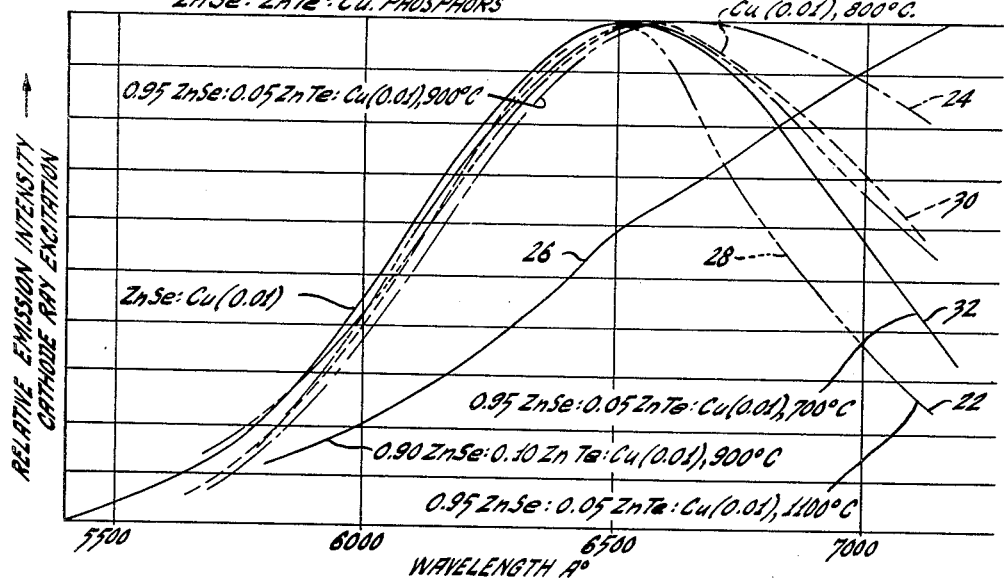
Figure 8 is a family of curves illustrating the spectral distribution of the emission from several phosphors of the invention when excited with cathode rays.

The composition of the fired product calculated from the composition of the initial mixture is 0.95 ZnSe:0.05 ZnTe:Cu (0.01). Referring to Figure 8, the spectral distribution of the emission from this phosphor when excited with cathode ray excitation is shown by curve 24. Referring to Figure 9, the relative peak emission intensity of this phosphor as a function of current density is shown by curve 38.

*Example 7.*—To a mixture of 97.0 grams of zinc selenide and 3.0 grams of ZnTe, add 0.01 gram of copper as an aqueous solution of copper nitrate and 2 grams of ammonium chloride. Slurry the mixture with triple distilled water, dry and fire at 900° C. in a nitrogen atmosphere for about 45 minutes. The composition of the fired product calculated from the composition of the initial mixture is 0.98 ZnSe:0.02 ZnTe:Cu (0.01).

The seleno-telluride phosphors are described with respect to particular zinc seleno-tellurides. Cadmium may be substituted for part or all of the zinc in the composition of the invention. The substitution of cadmium for zinc shifts the peak spectral emission toward the infrared end of the spectrum. Zinc telluride and zinc selenide for single phase solid solutions in all proportions when no sulfur is present. Some of the phosphors of the invention are therefore referred to as seleno-tellurides. The effect of substituting tellurium for selenium is to shift the peak spectral emission of the phosphors of the invention toward the infrared end of the spectrum. The ratio of zinc plus cadmium to selenium plus tellurium is about 1 to 1. Referring to Figure 8, curves 22, 24 and 26 illustrate the effect of substituting increasing amounts of tellurium and selenium.

Selenium, tellurium, zinc and cadmium may be introduced as elements or as compounds which are decomposed upon heating to yield the elements. It is preferred to introduce these elements as selenides and tellurides of zinc and cadmium.

The optimum amount of copper activator is approximately 0.01% by weight with respect to the weight of the host crystal, that is, the combined weight of zinc, cadmium, selenium and tellurium. The effect of varying the proportion of copper activator in the composition 0.95 ZnSe:0.05 ZnTe:Cu ($x$) is shown in Table II.

*Table II.—0.95 ZnSe:0.05 ZnTe:Cu ($x$)*

| Cu percent: | Relative peak emission intensity |
|---|---|
| 0.001 | 10 |
| 0.005 | 17 |
| 0.01 | 20 |
| 0.05 | 2.5 |

Silver may be substituted for copper as the activator to impart to the host crystal similar luminescent properties. The proportion of activator may be varied in between 0.0001 and 0.1% by weight with respect to the weight of the host crystal. Copper and silver preferably are introduced as salts such as chlorides or nitrates.

A flux is added to assist the recrystallization of the host crystal. Chlorides, bromides and iodides of alkali metal, alkaline earth metal and volatile cations may be used. For example, calcium bromide and sodium iodide may be used. Ammonium chloride is the preferred flux. Between 0.1 to 10.0 percent by weight of flux with respect to the weight of host crystal may be used. The preferred proportion is 2.0%.

Referring again to Figure 8, the effect of varying the firing temperature is shown on curves 24, 28, 30 and 32 for a phosphor of the composition 0.95 ZnSe:0.05 ZnTe:Cu (0.01). The relative peak emission intensity as a function of crystallization temperature is given in Table III.

*Table III.—0.95 ZnSe:0.05 ZnTe:Cu (0.01)*

| Crystallization temperature: | Relative peak emission intensity |
|---|---|
| 700° C | 29 |
| 800° C | 52 |
| 900° C | 42 |
| 1100° C | 1 |

Referring to Figure 9, the effect of varying the crystallization temperature upon the current density characteristic of the phosphor is shown by curves 34, 36, 38 and 40.

Under oxidizing conditions during firing, two phases are evident with a 800° C. crystallization firing. A single phase appears at about 900° C. in an oxidizing atmosphere. However, this material exhibits a decreased emission intensity under cathode ray excitation. A non-oxidizing atmosphere, such as argon, nitrogen or hydrogen, is preferred. The preferred atmosphere is nitrogen. The firing may be carried out within the range between 650° C. and 1100° C., however, a firing temperature of 900° C. is preferred. Firing should be carried on until the solid state reaction take place. The duration of firing depends in part on the batch size. It is preferred to fire the batches of the examples for about 30 minutes.

One of the virtues of the phosphors of the invention is that they exhibit exceedingly small color shift of the emission when the phosphor is excited with varying densities of cathode rays. The results of the demountable measurements of the color shift of a phosphor of the invention compared with a well-known copper-activated zinc selenide phosphor are given in Table IV. The values for the x-coordinate of the CIE chart are shown.

*Table IV.—Color shift*

| Phosphor | Defocused Raster | Focused Raster |
|---|---|---|
| ZnSe:Cu (0.01) | 0.662 | 0.695 |
| 0.95 ZnSe:0.05 ZnTe:Cu (0.01) | 0.662 | 0.662 |

One of the features of the invention is a method for reducing the color shift of the emission from selenide-dominated phosphors when excited with varying densities of cathode rays which comprises substituting tellurium for a portion of the selenium in the host crystal. The phosphors of the invention are also luminescent under ultraviolet excitation.

III. SELENO-TELLURIDES FOR ELECTRIC FIELD EXCITATION

*Example 8.*—Mix 0.97 mol pure zinc selenide, 0.03 mol pure zinc telluride, 0.15 weight percent of copper as copper bromide and 10 weight percent of ammonium bromide. The weight percents are with respect to the total weight of zinc selenide plus zinc telluride. The mixture is then fired at about 900° C. in an inert atmosphere such as nitrogen for about 30 minutes. The fired material is cooled in nitrogen and then treated with an aqueous solution of an alkali cyanide, such as sodium cyanide, to remove copper compounds from the surface of the particles. The treated material is dried and is then ready for use as a red-emitting electroluminescent material. The composition of the fired product calculated from the initial mixture of 0.97 ZnSe:0.03 SnTe:Cu (0.15):Br.

Referring to Figure 10, the spectral distribution of the electroluminescence emission from this phosphor when excited with electric fields of the order of 250 volts per mil peak to peak at 10 kc. is shown by the curve 42. Curve 44 illustrates the spectral distribution of a similar phosphor prepared without tellurium excited under similar conditions. The substitution of tellurium for selenium shifts the peak wavelength toward the red end of the spectrum and increases the brightness of electroluminescence of the phosphor.

*Example 9.*—Slurry a mixture of 0.94 mol zinc selenide, 0.06 mol zinc telluride, 0.20 weight percent of copper as copper nitrate in triple distilled water. Dry and fire the mixture at about 950° C. in an atmosphere of hydrogen bromide for about 30 minutes. The composition of the fired product calculated from the initial mixture is 0.94 ZnSe:0.06 ZnTe:Cu (0.20):Br.

The electroluminescence brightness of the copper-activated zinc seleno-telluride phosphors herein may be further increased through the use of multiple activators. This may be accomplished by first incorporating the copper activator and a gallium coactivator into the host crystal material; and then incorporating the bromide. The following example illustrates this method.

*Example 10.*—Mix 0.97 mol zinc selenide, 0.03 mol zinc telluride, 0.15 weight percent of copper, as copper nitrate, and 0.15 weight percent of gallium as gallium nitrate. Then fire the raw batch at about 950° C. for about 30 minutes in a nitrogen atmosphere. Upon cooling, mix 10 weight percent of ammonium bromide with the fired product and refire at about 950° C. for about 30 minutes in a nitrogen atmosphere. After refiring, the product is washed with a hot aqueous potassium cyanide solution and then dried. The product exhibits a bright red electroluminescence and has the following formula as calculated from the raw batch: 0.97 ZnSe.0.03 ZnTe:Cu (0.15):Ga(0.15):Br. Table V includes a comparison of the brightness of this phosphor with other red-emitting electroluminescent phosphors.

Between 0.05 and 0.25 weight percent of gallium may be used. Other parameters may be varied as previously described. The proportion of bromine and gallium is not critical because the proportion actually incorporated is limited by the proportion of copper incorporated in the host crystal.

*Table V*

| Phosphor | Relative EL Emission Intensity (at 10 kc.) | |
|---|---|---|
| | No Filter | Red Filter (Wratten #25) |
| ZnSe:Cu:Br | | 0.030 |
| 0.95 ZnSe:0.05 CdSe:Cu:Br | 0.20 | 0.036 |
| 0.97 ZnSe:0.03 ZnTe:Cu:Br | 1.4 | 0.36 |
| 0.97 ZnSe:0.03 ZnTe:Cu:Br:Ga | 4.6 | 2.7 |

Selenium, tellurium and zinc may be introduced in elemental form or as compounds which decompose upon heating to yield them into the reaction. It is preferred to introduce these ingredients as selenides and tellurides of zinc.

The ingredients of the raw batch should be of luminescence grade purity, and should contain no spectroscopically detectable impurities. Pure zinc selenide may be obtained by precipitation out of a pure aqueous zinc acetate solution, using hydrogen selenide gas. Zinc telluride may be obtained by adding pure elemental tellurium in several small proportions to molten zinc metal at about 800° C. in an atmosphere of hydrogen. The temperature is then raised to 1300° C. and held for 15 minutes to boil off unreacted zinc and tellurium. After cooling, the zinc telluride is ground and sifted.

Cadmium substituted for zinc, also shifts the peak wavelength of the product toward the red end of the spectrum. However, cadmium substituted for zinc decreases the electroluminescence emission intensity.

The substitution of tellurium for selenium in a zinc selenide host crystal is easily accomplished, producing red-emitting and infrared emitting electroluminescent materials with electroluminescence emission intensities far greater than the corresponding cadmium containing materials. In addition, the red-emitting electroluminescent materials herein, are more color saturated than corresponding phosphors of the copper-activated zinc-cadmium selenide system. Referring to the table, typical phosphors of each system are tabulated with their respective relative brightness.

It is preferred to substitute 0.1 to 10 mol percent of tellurium for selenium in the host crystal. The preferred compositions herein are:

$$a\text{ZnSe}:b\text{ZnTe}:\text{Cu}(c):\text{Br}$$

where:

$a = 0.900$ to $0.999$ mols
$b = 1.000 - a$ mols
$c = 0.5$ to $0.25$ weight percent with respect to the weight of the host crystal.

Copper is introduced as a salt thereof such as copper chloride, copper bromide, copper nitrate, or copper oxide. The optimum amount of copper is approximately 0.5 weight percent with respect to the weight of host crystal; i.e. with respect to the combined weight of zinc, tellurium, and selenium. The proportion of copper may be varied between 0.05 and 0.25 weight percent with respect to the weight of the host crystal.

A bromide flux is added to the raw batch to assist the recrystallization of the host crystal material during firing. Also, an activator proportion of the bromide is incorporated in the host crystal to improve the electroluminescence brightness and color saturation of the product. Bromides of the alkali metals, alkaline earth metals and volatile cations may be used; for example, sodium bromide, ammonium bromide, calcium bromide and potassium bromide. Ammonium bromide is the preferred flux. Between 1.0 and 20 weight percent of the flux with respect to the weight of the host crystal may be used. The preferred proportion is 10 weight percent. In place of a flux, the raw batch may be fired in an atmosphere containing a high vapor pressure of bromine, such as in an atmosphere of hydrogen bromide.

The firing is preferably carried out with a flux in an inert atmosphere, such as argon, nitrogen or hydrogen but preferably nitrogen. The firing may be carried out within the range of 800° C. and 1050° C. The preferred firing temperature is 900° C. Firing should be carried out until the solid state reaction is complete. The duration of firing time depends on the batch size. It is preferred to fire the raw batch in 30 to 45 minutes.

IV. SULFO-SELENO-TELLURIDES

Sulfo-seleno-telluride phosphors herein follow the same teachings as in the foregoing sections. Thus, starting with any sulfo-selenide of zinc, cadmium or zinc-cadmium, tellurium may be substituted for sulfur and/or selenium. The useful single phase solid solutions are shown by the shaded area of Figure 11. Generally, where the sulfide is present in proportions 5 mol percent or less of the host crystal, the telluride may be present in all proportions. Where the sulfide is present greater than 5 mol percent, the telluride may be present in proportions up to 15 mol percent.

*Example 11.*—Slurry 44.5 grams of zinc sulfide, 47.0 grams zinc selenide, and 11.0 grams zinc telluride with 0.01 gram cupric chloride and 2 grams ammonium bromide in triple distilled water. Dry and fire the mixture at 1000° C. in a nitrogen atmosphere for about 30 minutes. The composition of the fired product as calculated from the metal mixture is 0.47 ZnS:0.47 ZnSe:0.06 ZnTe:Cu (0.01).

Table VI lists further examples of the sulfo-seleno-tellurides. All cathodoluminescence emission intensity readings (CL Int.) are normalized against a Willemite Standard as 66. There is also shown the location of the peak cathodoluminescence (CL Peak) in A., the electroluminescence emission intensity (EL Int.) and location of the peak electroluminescence (EL Peak) in A. The numbered compositions are located on the triaxial diagram of Figure 11.

*Table VI*

| No. | Composition in Mol Percent | | | Cu, Wt. Percent | CL | | EL | |
|---|---|---|---|---|---|---|---|---|
| | ZnS | ZnSe | ZnTe | | Int. | Peak (A.) | Int. | Peak (A.) |
| 1 | .80 | .10 | .10 | 0.1 | 21 | 5,500 | 0.20 | 5,700 |
| 2 | .60 | .30 | .10 | 0.1 | 10 | 5,700 | 1 | 6,000 |
| 3 | 130 | .60 | .10 | 0.1 | 1 | 5,950 | 4 | 6,000 |
| 4 | .10 | .80 | .10 | 0.1 | 0.5 | 5,950 | 0.32 | 6,250 |
| 5 | .75 | .20 | .05 | 0.1 | 28 | 4,900 | 30 | 5,400 |
| 6 | .475 | .475 | .05 | 0.1 | 31 | 5,500 | 20 | 5,750 |
| 7 | .20 | .75 | .05 | 0.1 | 27 | 5,600 | 1 | 5,900 |
| 8 | .55 | .30 | .15 | 0.1 | 10 | 5,850 | 0.4 | 6,000 |
| 9 | .35 | .50 | .15 | 0.1 | 0.5 | 5,950 | 0.62 | 6,100 |
| 10 | .90 | | .10 | 0.01 | 54 | 5,200 | | |
| 11 | | .90 | .10 | 0.01 | 9 | 6,400 | | |
| 12 | | .99 | .01 | 0.01 | 9 | 6,100 | | |
| 13 | 0.50 | .50 | | 0.01 | 58 | 5,800 | | |
| 14 | | 1.00 | | 0.01 | 20 | 6,400 | | |
| 15 | (1) | (1) | (1) | | 66 | | | |

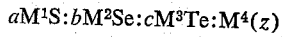
1 Willemite Standard.

Referring to Figure 6, a cathode ray tube may include a luminescent screen comprising a luminescent material of the invention. The cathode ray tube may comprise a tube base 69 including cathode ray gun 71 and a glass envelope comprising a neck portion 73, a conical portion 75 and a face plate 77. On the inner surface of the face plate 77 is disposed a thin layer 79 of a composition including a phosphor of the invention. The thin layer 79 is referred to as a luminescent screen and may comprise a uniform composition throughout adapted to produce monochromatic images, or it may comprises a plurality of areas of different composition having different emission characteristics adapted to produce polychromatic images. The luminescent screens of the invention may comprise a layer including a phosphor of the invention upon any substrate which is inert to the materials of the layer.

Electroluminescent cells may be prepared by depositing a slurry comprising a finely-powdered phosphor of the invention suspended in a dielectric medium, such as castor oil, between a pair of transparent electrically-conducting electrodes. The phosphor emits light when a voltage is applied across the electrodes.

Referring to Figure 7, another electroluminescent cell comprises a transparent base 87 such as a sheet of glass, a transparent electrically-conducting layer 85 thereon, such as glass treated with tin chloride, a layer 85 thereon comprising a powdered phosphor of this invention dispersed in a solid or semi-solid dielectric medium of reasonable light-transmitting properties such as wax, resin or plastics, and a metallic coating 81 thereon such as aluminum. The metallic coating 81 and the transparent electrically-conducting coating 85 are connected to a voltage source 93 through a switch 91 and a potentiometer 89. Upon applying a voltage, light may be observed through the transparent base 87. Generally, the higher the electric field across the electroluminescent layer 83, the greater the emission intensity.

There have been described mixed chalcogenide phosphors, methods for preparing such phosphors, cathode luminescent screens, and cathode ray tubes including said phosphors, and electroluminescent screens and devices including said phosphors. These phosphors and screens of the invention emit blue to yellow radiation when excited.

What is claimed is:
1. A phosphor having the molar composition

$$aM^1S:bM^2Se:cM^3Te:M^4(z)$$

Wherein:

$M^1$, $M^2$ and $M^3$ are each at least one member of the group consisting of zinc and cadmium
$M^4$ is at least one member of the group consisting of copper, silver, gold, and manganese
$a = 0.000$ to $0.050$ mol
$b = 0.000$ to $0.999$ mol
$c = 0.001$ to $0.999$ mol
$a + b + c = 1.000$
and $z = 0.000$ to $0.500$ weight percent of said composition.

2. The phosphor of claim 1 wherein $M^1$, $M^2$ and $M^3$ are each zinc.

3. A phosphor consisting essentially of a single phase solid solution having the composition $$xM^1Se:yM^1Te:M^4(z)$$

wherein: $M^1$ is at least one member selected from the group consisting of zinc and cadmium, and $M^4$ is one member selected from the group consisting of copper and silver, $x = 0.999$ to $0.001$ mol, $y = 0.001$ to $0.999$ mol, $x + y = 1$, and $z = 0.0$ to $0.5$ weight percent.

4. A phosphor having the composition $$xZnSe:yZnTe:Cu(z)$$

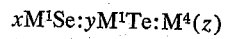

wherein: $x = 0.999$ to $0.001$ mols, $y = 0.001$ to $0.999$ mols, $x + y = 1$ and $z = 0.0$ to $0.5$ weight percent.

5. A phosphor consisting essentially of 0.95 ZnSe:0.05 ZnTe:Cu (0.01).

6. A phosphor consisting essentially of 0.98 ZnSe:0.02 ZnTe:Cu (0.01).

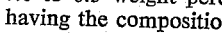

7. An electroluminescent phosphor having a host crystal consisting essentially of a solid solution of zinc selenide, 0.1 to 10 mol percent of zinc telluride, and activator proportions of copper, and activator proportions of a member of the group consisting of (1) bromine, and (2) bromine and gallium incorporated in said host crystal.

8. An electroluminescent phosphor having the molar composition $a$ZnSe.$b$ZnTe:Cu($c$):Br where:

$a$ = 0.900 to 0.995 mols
$b$ = 1.000 − $a$ mols, and
$c$ = 0.05 to 0.25 weight percent with respect to the weight of the host crystal.

9. An electroluminescent phosphor having the molar composition $a$ZnSe.$b$ZnTe:Cu($c$):Br:Ga where:

$a$ = 0.900 to 0.995 mols
$b$ = 1.000 − $a$ mols
$c$ = 0.05 to 0.25 weight percent with respect to the weight of host crystal.

References Cited in the file of this patent

UNITED STATES PATENTS

| | | |
|---|---|---|
| 2,402,757 | Leverenz | June 25, 1946 |
| 2,402,759 | Leverenz | June 25, 1946 |
| 2,477,070 | Leverenz | July 26, 1949 |
| 2,505,621 | Leverenz | Apr. 25, 1950 |
| 2,597,660 | McKeag | May 20, 1952 |
| 2,623,859 | Kroger | Dec. 30, 1952 |
| 2,698,915 | Piper | Jan. 4, 1955 |
| 2,742,376 | Larach | Apr. 17, 1956 |
| 2,767,049 | Nitsche | Oct. 16, 1956 |
| 2,818,391 | Crosby | Dec. 31, 1957 |
| 2,847,386 | Mazo | Aug. 12, 1958 |

UNITED STATES PATENT OFFICE

CERTIFICATION OF CORRECTION

Patent No. 2,978,417                      April 4, 1961

Simon Larach

It is hereby certified that error appears in the above numbered patent requiring correction and that the said Letters Patent should read as corrected below.

Column 1, line 63, for "sulfo-tellurides" read -- sulfo-seleno-tellurides --.

Signed and sealed this 5th day of September 1961.

SEAL)
Attest:

ERNEST W. SWIDER                      DAVID L. LADD
Attesting Officer                      Commissioner of Patents